United States Patent [19]

Bores et al.

[11] Patent Number: 4,715,649
[45] Date of Patent: Dec. 29, 1987

[54] LOCATOR AND HOLD-DOWN LATCH FOR REMOVABLE VEHICLE ROOF PANELS

[75] Inventors: Leonard F. Bores, Dearborn; Mark J. Zdziarski, Taylor, both of Mich.

[73] Assignee: ASC Incorporated, Southgate, Mich.

[21] Appl. No.: 947,031

[22] Filed: Dec. 29, 1986

[51] Int. Cl.$^4$ .............................................. B60J 7/10
[52] U.S. Cl. .................................... 296/218; 296/224
[58] Field of Search ................... 296/218, 224; 49/465

[56] References Cited

U.S. PATENT DOCUMENTS

| 4,115,955 | 9/1978 | Aldrich | 296/218 |
| 4,408,795 | 10/1983 | Saitoh | 296/218 |

FOREIGN PATENT DOCUMENTS

| 2813650 | 10/1979 | Fed. Rep. of Germany | 296/218 |
| 3030818 | 2/1981 | Fed. Rep. of Germany | 296/218 |

*Primary Examiner*—Robert R. Song
*Attorney, Agent, or Firm*—Arnold S. Weintraub

[57] ABSTRACT

A locating and latch down assembly device for a removable vehicle roof panel and a roof panel provided with such a device are disclosed. A tapering finger connector is mounted on the center of the rear edge of the roof panel and extends outwardly and inwardly therefrom. The tapering finger connector has a detent formed on a bottom face thereof which extends through the width. A tapering slot connector adapted to receive the finger connector is formed in the center of a rear edge of opening in the roof. A cylinder is mounted on the bottom face of the slot connector and extends laterally therethrough. The cylinder is adapted to engage the detent when the finger connector is inserted into the slot connector, thereby serving to align and latch the connectors to each other and the panel to the vehicle. The tapering slot connector may be formed in a roll bar extending along the rear edge of the roof opening.

8 Claims, 3 Drawing Figures

LOCATOR AND HOLD-DOWN LATCH FOR REMOVABLE VEHICLE ROOF PANELS

BACKGROUND OF THE INVENTION

1. Field of the Invention

The present invention relates to the field of removable roof panels for insertion in and removal from an opening formed in a roof of a vehicle and more particularly to means for locating and latching the panel in the proper position relative to the roof opening.

2. Description of the Prior Art

Sunroofs have become an increasingly popular option in new cars. One common type of sunroof is the removable type which is manually removed from the roof opening of the car and stored away in the trunk, etc. When the user wishes to enclose the roof opening in the vehicle, the sunroof must be manually positioned in the roof opening and latched or locked thereto. It would be desirable to provide the user with a removable sunroof which is easily positioned and locked when the sunroof is mounted in the roof opening. To that end the present invention is directed by providing a simple and quick way to align and latch the sunroof in the roof opening.

Previously devised removable sunroofs or T-tops merely show the provision of outwardly extending bayonets or tabs mounted on the roof panel which fit into correspondingly shaped slots to provide locating and pivoting movement of the roof panel. Such bayonets or tabs do not provide a positive lock, but rather serve to guide the roof panel into position in the roof opening. Positioning tabs of this type are found in U.S. Pat. Nos. 4,408,795 and 4,115,955.

SUMMARY OF THE INVENTION

The present invention is a locating and hold-down latch assembly for a removable sunroof panel designed to fit in a roof opening of the vehicle. The roof panel may be easily and quickly removed from the opening and remounted therein. The device of the present invention not only permits the sunroof panel to be securely latched down to the vehicle roof when in a closed position, but also provides a locating guide in the form of a tapering finger connector which is mounted on the center of the rear edge of the panel and extends outwardly and rearwardly therefrom. The tapering finger further comprises a detent formed on a bottom face thereof and extending through the width thereof. A tapering slot connector adapted to receive the finger connector is formed in the center of the rear edge of the roof opening. A cylinder mounted on a bottom face of the slot connector and extending laterally therethrough is adapted to engage the detent when the finger connector is inserted into the slot connector, thereby serving to align and latch the connectors to each other and the panel to the vehicle and to prevent horizontal displacement therebetween.

In a preferred embodiment of the present invention, a roll-bar is disposed along the rear edge of the roof opening and the tapering slot connector is formed in the center thereof. The detent formed in the tapering finger connector is disposed on a portion of the bottom face thereof adjacent the rear edge of the panel. The cylinder adapted to engage the detent is mounted on the portion of the bottom face of the slot connector adjacent the roll bar.

In an alternative embodiment, a pair of tapering finger connectors are mounted on opposite sides of the rear edge of the sunroof panel and a pair of tapering slot connectors are formed in corresponding positions on the roll bar. By employing a pair of locators and hold-down latch assemblies, an even more stable and secure mount is provided to the sunroof panel relative to the roof opening.

The hold-down and latch assembly of the present invention may be used in conjunction with other locating and latching devices disposed along a front edge or side edges of the removable roof panel and roof opening. Such devices might comprise for example stationary locating pins, retractable pins, sliding pins, etc.

A removable roof panel removably insertable into an opening formed in the roof of a vehicle provided with at least one locating and latch down assembly mounted on a rear edge thereof is also described and claimed. The locating and locking assembly may be used in conjunction with other locating and latch down devices as described above. Generally, it will be found advantageous to employ either a pair of the assemblies mounted on opposite edges of the roof panel and roof opening or one such assembly mounted on the center rear edge of the roof panel and roof opening.

In use, the tapering fingering connector on the rear edge of the sunroof panel is aligned with the tapering slot connector formed in the roll bar and inserted thereinto. Because of the tapering shape of the members, the finger may be inserted all the way into the slot and the detent slid onto the cylinder. Once the detent has been engaged with the cylinder, however, accidental forward and rearward axial movement of the roof panel with respect to the roof opening is prevented, thereby giving a secure and rattle free mount to the roof panel. At the same time the rear edge of the panel is aligned with the front edge of the roof opening and the tapering finger is inserted into the tapering slot connector, the front of the panel will drop into its correct position relative to the roof opening.

BRIEF DESCRIPTION OF THE DRAWINGS

The description herein makes reference to the accompanying drawings wherein the reference numerals refer to like parts throughout the several views and wherein.

DESCRIPTION OF THE PREFERRED EMBODIMENTS

Figure 1:
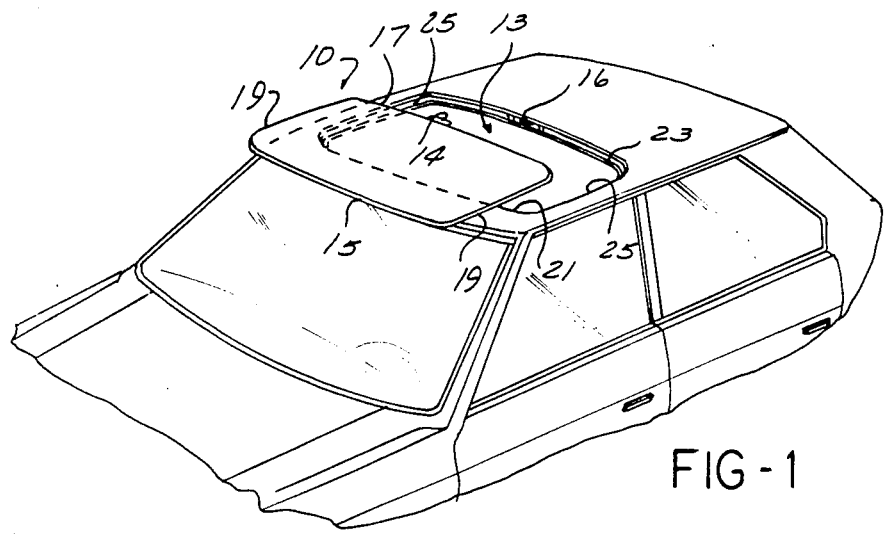
FIG. 1 is a perspective view of the roof opening of a vehicle with the roof panel ready to be lowered into position.

Referring now to the drawings and in particular to FIG. 1 wherein there is illustrated a preferred embodiment of the locating and latch down assembly device and roof panel of the present invention. FIG. 1 illustrates a perspective view of a removable roof panel 10 comprised of front edge 15, rear edge 17 and side edges 19. Removable roof panel 10 is adapted to be removably received by an opening 13 located in the roof of a vehicle. Opening 13 comprises front edge 21, rear edge 23 and side edges 25. A means 12 for locating and latching down the panel 10 within the associated opening 13 is provided so that a water-tight and air-tight seal is formed and the appearance of a smooth roof line is given.

Latch down means 12 comprises a tapering finger connector 14 which is mounted on the center of rear edge 17 of roof panel 10 and extends outwardly and rearwardly therefrom. Tapering finger connector 14 is engageable with a tapering slot connector 16 formed in the center of a rear edge 23 of opening 13; in this case rear edge 23 comprises a roll-bar 18.

Figure 2:
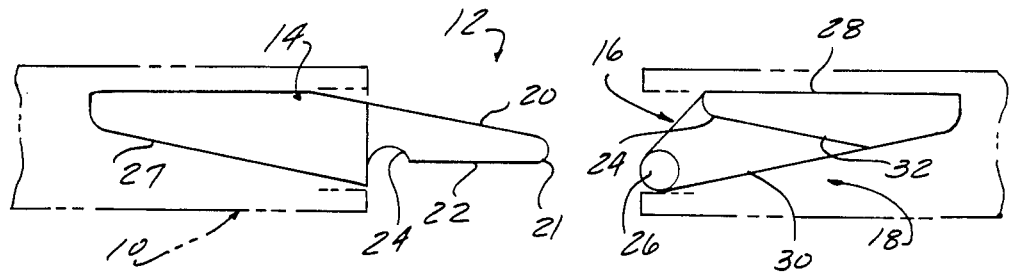
FIG. 2 is a side plan view of the tapering finger connector mounted to the edge of the roof panel and the tapering slot connector formed in the roll bar illustrating in detail the parts thereof.

Referring now to FIG. 2 wherein there is depicted the connector numbers of the assembly device of the present invention in greater detail. Tapering finger connector 14 is comprised of a first portion 21 which extends outwardly from the roof panel 10 and a second portion 27 which is disposed interiorly of roof panel 10. Projecting portions 21 is comprised of a longer tapering edge 20 and a shorter edge 22 which extends substantially parallel to roof panel 10. Edges 20 and 22 meet at their outwardly extending ends to form two sides of a triangle, the corner of the triangle being somewhat rounded. Formed along a portion of edge 22 is a detent 24 which may be semi-circularly shaped. Preferably, detent 24 is formed on a portion of edge 22 immediately adjacent the interiorly disposed portion 27 of tapering finger connector 14.

Figure 3:
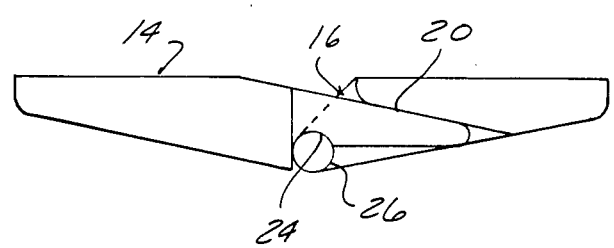
FIG. 3 is a side plan view of the connector members of FIG. 2 when in an engaged position.

The tapering slot connector 16 is disposed interiorly of roll bar 18. It is comprised of a longer tapering side 30 and a shorter side 28 which extends substantially parallel to the plane of the roll bar 18. Disposed between tapering side 30 and shorter side 28 is a tapering member 24, which is approximately triangularly shaped with a tapering side 32 thereof. Tapering side 32 slopes at an angle corresponding to that of tapering side 20 of tapering finger connector 14. Mounted on tapering side 30 is a cylindrical member 26. Cylindrical member 26 is of a length sufficient such that it corresponds to the width of tapering slot connector 16 and extends laterally therethrough. The cylinder 26 is of a diameter appropriate to engage detent 24 when tapering finger connector 14 is inserted into tapering slot connector 16. The engagement of detent 24 with cylinder 26 is illustrated in FIG. 3, which shows their relationship when the two connectors are fully engaged.

The tapering sides 20 of the tapering finger connector 14 and 30 and 32 of tapering slot connector 16 permit tapering finger connector 14 to be easily inserted into tapering slot connector 16. As the finger connector is inserted into the slot connector, side 22 of tapering finger connector 14 will encounter cylinder 26 of tapering slot connector 16. The cylinder 26 will cause tapering finger connector 14 to swivel upward at a slightly oblique angle. However, as finger connector 14 is more fully inserted into slot connector 16, cylinder 26 will encounter the detent 24. Upon the occurrence of this event, the tapering finger connector 14 will be able to drop into correct alignment with regard to tapering slot connector 16. At this point, detent 24 will be fully engaged with cylinder 26. The sunroof panel 10 will be correctly aligned with respect to roll bar 18 and present an aerodynamically efficient and aesthetically pleasing appearance. The engagement of cylinder 26 with detent 24 will prevent any unwanted axial displacement therebetween. Thus, the sunroof panel 10 will be held in the roof opening 12 in a snug, rattle-free, lock-down position.

Sunroof panel 10 may be easily removed from roof opening 12 upon a slight vertical displacement upwards of tapering finger connector 14. This upward vertical displacement will permit detent 24 to become disengaged from cylinder 26. Tapering finger connector 14 may be then slidingly disengaged from tapering slot connector 16.

Although not depicted in the drawings, roof panel 10 may comprise a pair of locating and latch down assembly devices mounted on opposite sides of a sunroof panel and a roof opening of a vehicle. Additionally, the removable sunroof panel may comprise additional locating and latch down devices of other types mounted on, for example, the front edge thereof. Equipping a removable sunroof panel with a plurality of the assembly devices disclosed herein or with locating and latch down devices of other types may provide even more stability to the sunroof panel when it is mounted in the roof opening.

In summary, there has been disclosed a new and improved assembly device for locating and latching down a removable vehicle roof panel, and a roof panel provided with such a device. The device enables easy alignment and installation of the roof panel in the roof opening, and also provides a secure latch down and prevents unwanted displacement thereof.

Having thus described the invention what we claim is:

1. A locator and hold-down latch for a removable sunroof panel having front and rear edges and designed to fit in a roof opening of a vehicle, said latch comprising:
    a tapering finger connector mounted on the center of the rear edge of the panel and extending outwardly and rearwardly therefrom;
    a detent formed on a bottom face of the finger connector and extending through the width thereof;
    a tapering slot connector adapted to receive the finger connector, said slot connector being formed in the center of a rear edge of the opening; and
    a cylinder fixedly mounted on a bottom face of the slot connector and extending laterally therethrough adapted to engage the detent when the finger connector is inserted into the slot connector thereby serving to align and latch the connectors to each other and the panel to the vehicle and to prevent axial displacement therebetween.

2. The latch of claim 1 wherein the rear edge of the roof opening comprises a roll bar.

3. The latch of claim 1 wherein the detent is disposed on a portion of the bottom face of the finger connector adjacent the rear edge of the panel.

4. The latch of claim 2 wherein the cylinder is mounted on a portion of the bottom face of the slot connector adjacent the roll bar.

5. A removable sunroof panel having front and rear edges and designed to fit in a roof opening of a vehicle and equipped with a locator and hold-down latch assembly, said latch assembly comprising:
    a tapering finger connector mounted on the center of the rear edge of the panel and extending outwardly and rearwardly therefrom;
    a detent formed on a bottom face of the finger connector and extending through the width thereof;
    a tapering slot connector adapted to receive the finger connector, said slot connector being formed in the center of a rear edge of the opening;
    a cylinder fixedly mounted on a bottom face of the slot connector and extending laterally therethrough adapted to engage the detent when the finger connector is inserted into the slot connector thereby serving to align and latch the connectors to each other and the panel to the vehicle and to prevent axial displacement therebetween.

6. The sunroof panel of claim 5 wherein the rear edge of the opening comprises a roll bar.

7. The sunroof panel of claim 5 wherein the detent is disposed on a portion of the bottom face of the finger connector adjacent the rear edge of the panel.

8. The sunroof panel of claim 6 the cylinder is mounted on a portion of the bottom face of the slot connector adjacent the roll bar.

* * * * *